(12) United States Patent
Certain

(10) Patent No.: US 10,131,425 B2
(45) Date of Patent: Nov. 20, 2018

(54) ROTARY WING AIRCRAFT HAVING A NON-DUCTED TAIL ROTOR WITH AT LEAST FIVE BLADES

(71) Applicant: AIRBUS HELICOPTERS, Marignane (FR)

(72) Inventor: Bernard Certain, Aix en Provence (FR)

(73) Assignee: AIRBUS HELICOPTERS, Marignane (FR)

( * ) Notice: Subject to any disclaimer, the term of this patent is extended or adjusted under 35 U.S.C. 154(b) by 349 days.

(21) Appl. No.: 14/946,862

(22) Filed: Nov. 20, 2015

(65) Prior Publication Data

US 2016/0144955 A1 May 26, 2016

(30) Foreign Application Priority Data

Nov. 20, 2014 (FR) ...................... 14 02616

(51) Int. Cl.
*B64C 11/06* (2006.01)
*B64C 11/30* (2006.01)
*B64C 27/82* (2006.01)

(52) U.S. Cl.
CPC .............. *B64C 27/82* (2013.01); *B64C 11/06* (2013.01); *B64C 11/30* (2013.01); *B64C 2027/8272* (2013.01)

(58) Field of Classification Search
CPC ......... B64C 11/02; B64C 11/04; B64C 11/06; B64C 11/30; B64C 27/82; B64C 27/8218; B64C 2027/8209; B64C 2027/8263
See application file for complete search history.

(56) References Cited

U.S. PATENT DOCUMENTS 2,818,224 A 12/1957 Sikorsky
3,594,097 A * 7/1971 Mouille ................. B64C 27/82
416/104

(Continued)

FOREIGN PATENT DOCUMENTS

EP 0018114 10/1980
FR 1411762 9/1965

(Continued)

OTHER PUBLICATIONS

European Examination Report dated Apr. 7, 2017, Application No. EP 15 194 282.8, 4 Pages.

(Continued)

*Primary Examiner* — Logan Kraft
*Assistant Examiner* — Christopher R Legendre
(74) *Attorney, Agent, or Firm* — Brooks Kushman P.C.

(57) ABSTRACT

A non-ducted tail rotor comprising a hub and at least five blades, each of the blades extending to a free end that, in rotation, describes a circle presenting a given "maximum" radius. The hub is rigidly secured to a drive shaft, the hub comprising a hollow circular body centered on an axis of rotation, the body presenting an "internal" radius between the axis of rotation and an outer periphery of the body, the internal radius lying in the range 0.2 times to 0.4 times the maximum radius, each blade presenting a root extended by an airfoil element projecting from the body, extending from the root to the free end, the root being swivel-hinged to the outer periphery about a pitch axis.

20 Claims, 2 Drawing Sheets

(56) References Cited

U.S. PATENT DOCUMENTS

| | | | |
|---|---|---|---|
| 4,195,800 A | 4/1980 | Wallace | |
| 4,344,739 A * | 8/1982 | Derschmidt | B64C 27/33 416/134 A |
| 4,626,173 A * | 12/1986 | Mouille | B29D 99/0025 416/134 A |
| 4,913,376 A | 4/1990 | Black | |
| 4,927,331 A * | 5/1990 | Vuillet | B64C 11/18 416/238 |
| 5,383,767 A | 1/1995 | Aubry | |
| 5,542,818 A | 8/1996 | Monvaillier et al. | |
| 5,634,611 A * | 6/1997 | Marze | B64C 27/82 244/17.19 |
| 5,984,635 A * | 11/1999 | Keller | B63H 11/12 244/17.11 |
| 8,689,538 B2 * | 4/2014 | Sankrithi | B64C 11/48 60/226.1 |
| 2004/0113013 A1 | 6/2004 | Pica | |
| 2011/0056183 A1 * | 3/2011 | Sankrithi | B64C 11/48 60/204 |
| 2012/0219417 A1 | 8/2012 | Podgurski | |
| 2016/0144955 A1 * | 5/2016 | Certain | B64C 27/82 416/147 |

FOREIGN PATENT DOCUMENTS

| | | |
|---|---|---|
| FR | 2699497 | 6/1994 |
| FR | 2719554 | 11/1995 |

OTHER PUBLICATIONS

French Search Report for French Application No. FR 1402616, Completed by the French Patent Office dated Jul. 22, 2015, 7 Pages.
Website Wikipedia Article Airfoil, English translation attached to original, retrived from the internet Nov. 24, 2015, All together 27 Pages ; https://en.wikipedia.org/wiki/Airfoil#Thin_airfoil_theory ; http://fr.wikipedia.org/wiki/Th%C3%A9orie_des_profils_minces.

* cited by examiner

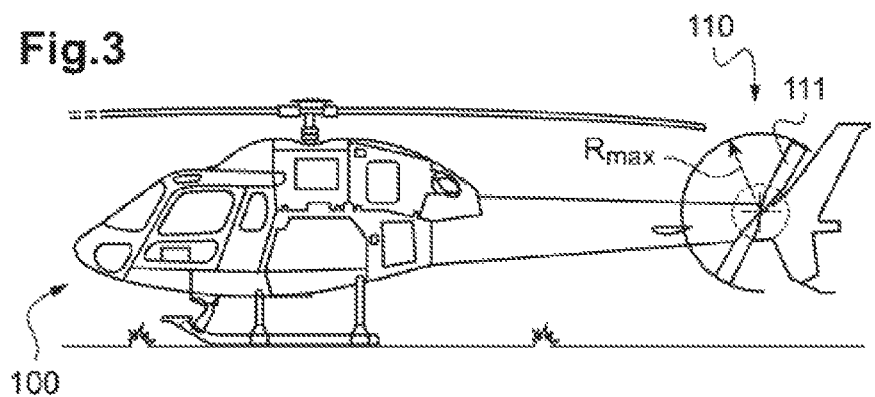
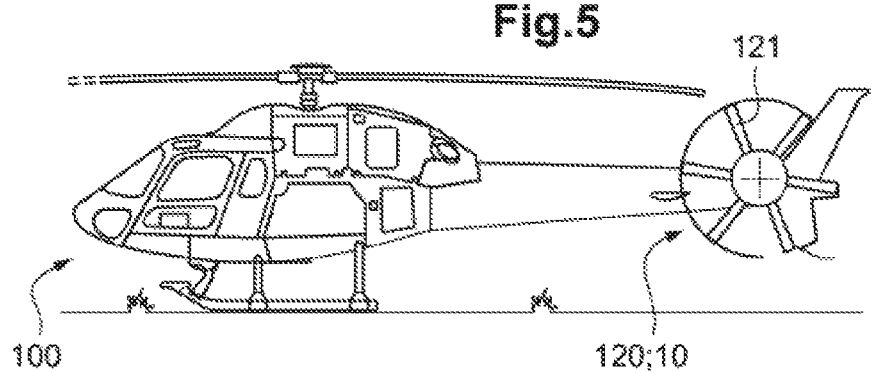
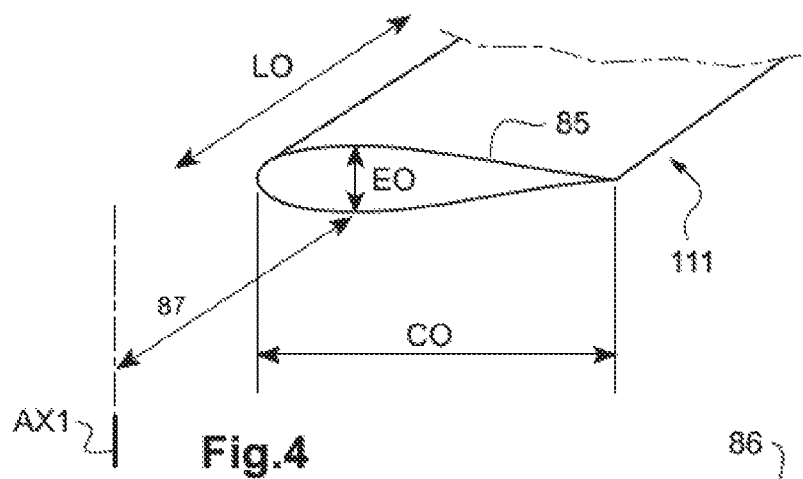
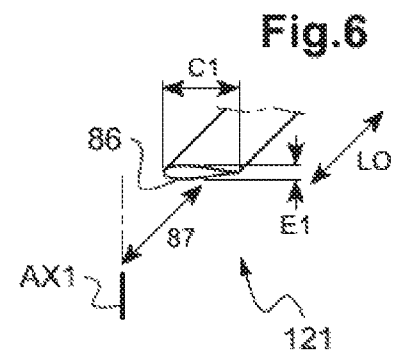

ROTARY WING AIRCRAFT HAVING A NON-DUCTED TAIL ROTOR WITH AT LEAST FIVE BLADES

CROSS REFERENCE TO RELATED APPLICATION

This application claims priority to French patent application No. FR 14 02616 filed on Nov. 20, 2014, the disclosure of which is incorporated in its entirety by reference herein.

BACKGROUND OF THE INVENTION (1) Field of the Invention

The present invention relates to a rotary wing aircraft having a non-ducted tail rotor with at least five blades. The invention thus relates to the technical field of rotorcraft tail rotors.

(2) Description of Related Art

A rotorcraft is usually provided with at least one main rotor providing the rotorcraft with at least part of its lift, and possibly also with its propulsion. In particular, and by way of example, a helicopter may include a single rotor providing it both with lift and with propulsion. Because of this function, such a rotor is referred to as a "main" rotor.

The main rotor may be driven by a power transmission gearbox, itself driven by at least one engine. In its rotation, the main rotor induces torque on the fuselage of the helicopter. This torque then tends to cause the fuselage to perform turning movement about a yaw axis. Consequently, a helicopter that has a single main rotor is usually provided with a device for controlling its yaw movement.

Such a device may comprise an auxiliary rotor arranged at the tail end of the helicopter. The auxiliary rotor exerts thrust having at least a transverse component for the purpose of controlling the yaw movement of the aircraft. Under such circumstances, the auxiliary rotor is sometimes referred to as the "tail" rotor because of where it is arranged, or indeed as an "anti-torque" rotor because of its ability to counter the torque generated by the main rotor on the fuselage. The term "tail" rotor is usually used below.

In order to control the yaw movement of the aircraft, a pilot controls the collective pitch of the blades of the tail rotor. Modifying this collective pitch leads to a modification to the thrust generated by the tail rotor. For example, a pilot may operate pedals connected to the tail rotor in order to control the movement of the aircraft about its yaw axis.

In a first alternative, the tail rotor is a non-ducted rotor.

Such a non-ducted rotor has a hub that is transversely offset relative to a tail fin. The hub carries at least two blades of large span. The blades present profiles with chords that are relatively large.

Thus, a light helicopter sometimes has a hinged tail rotor with two blades. A heavy helicopter may have at least five blades. The number of blades is determined as a function of the thrust that needs to be delivered in order to control the yaw movement of the aircraft. A manufacturer tends to minimize this number of blades in order to optimize the number of parts of the rotor, their price, and their weight.

Document U.S. Pat. No. 2,818,224 describes an aircraft having a non-ducted tail rotor carried by a vertical fin.

Furthermore, the Ecureuil® helicopter has two blades connected together diametrically by a common spar. The spar is hinged to a drive shaft. Thus, two half-shells surround the spar. The half-shells are hinged to a clevis of the shaft by a pin. Such a tail rotor is referred to as a "hinged" rotor because it is hinged to a drive shaft.

The spar has two twistable zones arranged on either side of the half-shells. Consequently, each twistable zone can be twisted to allow the pitch angle of each blade to be modified.

In order to control the pitch angle of a tail rotor blade, the aircraft has one pitch rod per blade. Each pitch rod is hinged to the root of the blade. For example, a collar is secured to the cover of the root of a blade, the collar then being hinged to a pitch rod.

Furthermore, laminated bearings are arranged between the half-shells and the collars. Such bearings are deformable in twisting and in shear.

Flight controls are consequently connected to the pitch rods in order to control the turning of each blade about a pitch axis. Such turning twists the twistable zones of the spar.

In addition, each blade is subjected in flight to aerodynamic forces.

The blades of a non-ducted tail rotor move through an air stream that is generated by the helicopter advancing. This air stream is referred to below as the "longitudinal" air stream, with reference to the direction of longitudinal advance of the aircraft.

Consequently, in its rotation, each blade travels over a half-revolution in the advancing direction of the helicopter in a position referred to as the "advancing" blade position. Conversely, each blade rotates through another half-revolution in the direction opposite to the advance direction of the helicopter in a position referred to as the "retreating" blade position.

Consequently, an advancing blade travels at a speed equal to the sum of the speed of rotation of the tail rotor plus the forward speed of the aircraft. Conversely, a retreating blade travels at a speed equal to the difference between the speed of rotation of the tail rotor and the forward speed of the aircraft. Unfortunately, the lift generated by a blade varies as a function of its speed relative to the incident air stream. Under such circumstances, a blade generates smaller lift in its retreating blade position than in its advancing blade position.

Since the tail rotor is hinged, this difference in lift leads to the tail rotor tilting about a substantially vertical tilt axis. This tilt axis corresponds to the axis of the pin hinging the half-shells of the rotor to a drive shaft.

This dynamic tilting of the tail rotor imparts dynamic forces to the blade pitch control linkage.

In particular, the pitch rod of a blade may be radially offset relative to a flapping axis of the blade, i.e. the axis of the pin in the above-described tail rotor context.

Consequently, the tilting of the rotor then tends to exert a dynamic force on each pitch rod.

In addition, static forces are also imparted to the blade pitch control linkage.

Each blade tends to be subjected to a return moment caused by the centrifugal force exerted on the blade. This return moment has the effect of returning each blade towards the plane of rotation of the rotor. This return-to-flat moment leads to forces being created in each pitch rod.

Consequently, the rotation of a blade leads to static and dynamic forces being created in the blade pitch control linkage. A pilot can then have difficulty in modifying the pitch of the blades, e.g. by moving pedals.

In order to remedy that, a servo-control may be interposed in the control linkage. The pilot's flight controls are then connected to the servo-control and it is the servo-control that is connected to each pitch rod.

Nevertheless, the provision of a servo-control can lead to a non-negligible increase in weight.

Furthermore, in the event of a hydraulic failure, the servo-control behaves like a rod. In order to assist the pilot in this configuration, the aircraft may include a force compensator. A force compensator may include a hydraulic pressure accumulator and a control lever interposed between the pitch rods and the servo-control.

In order to reduce the forces generated on a pitch control linkage, and in particular the static forces, the root of each blade may be provided with two heavy members referred to as "Chinese" weights.

Each Chinese weight projects in elevation from the cover of a blade in order to create a moment that tends to oppose the return moment. Nevertheless, Chinese weights have limited effectiveness on the dynamic forces suffered in flight, and can even tend to increase such dynamic forces.

Under such circumstances, a non-ducted tail rotor may be a hinged rotor that is subjected to static forces and dynamic forces that can stiffen the flight controls. Furthermore, these forces can be penalizing on the lifetime of laminated bearings, for example.

In addition, a non-ducted tail rotor is usually carried by a tail fin of small dimensions. Consequently, in the event of a break in the power transmission driving the tail rotor in rotation, the tail fin runs the risk of generating insufficient lateral lift to counter the torque generated by the main rotor.

In a second alternative, the tail rotor is a ducted tail rotor.

A ducted tail rotor includes a fairing. The fairing is a component portion of a tail fin of large dimensions.

In addition, a ducted tail rotor has a rotor of small dimensions arranged within the fairing. The rotor is provided with a hub carrying small-span blades of profiles that present chords that are relatively small.

The thrust generated by the rotor is then relatively small, about half the thrust generated by a non-ducted tail rotor. Nevertheless, the fairing also generates thrust that is about half of the thrust generated by a non-ducted tail rotor. Under such circumstances, the fairing and the rotor of a ducted tail rotor together generate total thrust that is sufficient for controlling the yaw movement of the aircraft.

Installing ducted tail rotor is advantageous, but nevertheless requires a fin of large dimensions to be put into place. Such a fairing is then penalizing from a weight point of view.

In addition, the fairing protects the rotary portion of a ducted tail rotor against the impact of a longitudinal air stream. Consequently, a ducted tail rotor avoids creating dynamic forces by arranging a fairing around the blades.

Document FR 2 719 554 describes a ducted tail rotor.

Document FR 2 699 497 describes a device for connecting a blade to a hub that is applicable to the blades of a variable pitch multiblade rotor, for a ducted tail rotor of a helicopter.

Documents that do not belong to the technical field of the invention are mentioned by way of information only.

Document US 2012/0219417 describes a rotor with retractable blades.

Document US 2004/0113013 describes a lift rotor having a peripheral ring.

Document U.S. Pat. No. 4,913,376 describes two contrarotating rotors of an autogyro.

Document U.S. Pat. No. 4,195,800 describes a lift rotor for an autogyro, the rotor having a central disk of large dimensions.

Documents FR 1 411 762 and EP 0 018 114 are also known.

BRIEF SUMMARY OF THE INVENTION

An object of the present invention is thus to propose a rotor that is an alternative to the above-described rotors in order to limit the forces in a blade pitch control linkage of the rotor.

The invention thus provides a non-ducted tail rotor for a rotary wing aircraft, the non-ducted tail rotor comprising a hub and a plurality of blades, the non-ducted tail rotor having a drive shaft connected to the hub in order to set the blades into rotation about an axis of rotation, each of the blades extending to a free end that, in rotation, describes a circle presenting a given radius referred to as the "maximum" radius.

The maximum radius thus represents the radius of a circle described by the blades of the non-ducted tail rotor.

The non-ducted tail rotor is remarkable in particular in that the hub is rigidly secured to the drive shaft, the plurality of blades comprising at least five blades, the hub comprising a hollow circular body centered on the axis of rotation, the body presenting a radius referred to as the "internal" radius between the axis of rotation and an outer periphery of the body, the internal radius lying in the range 0.2 times to 0.4 times the maximum radius, and possibly in the range 0.25 times to 0.4 times the maximum radius, each blade presenting a root extended by an airfoil element projecting from the body, extending from the root to the free end, the root being swivel-hinged to the outer periphery about a pitch axis.

An airfoil element of a blade is an element that generates lift, thereby giving rise to the thrust that is created by the blade. Thus, a blade portion situated in a fairing, e.g. in the hub, is not an airfoil element.

Consequently, the prior art describes a non-ducted tail rotor of large diameter having a small hub carrying as few blades as possible. By way of example, such a large diameter is greater than 1.5 meters (m), while the diameter of the hub is of the order of 10 centimeters (cm) for example.

In order to improve that concept, the state of the art includes a ducted rotor of small diameter, e.g. about one meter. Nevertheless, such a ducted rotor does not suffer from the problems that result from dynamic forces created in flight. Furthermore, the presence of the fairing gives significant weight to a ducted tail rotor, making it difficult to implement in an existing rotorcraft for center-of-gravity reasons.

Conversely, the invention proposes a novel non-ducted tail rotor of large diameter, e.g. greater than 1.5 m. The non-ducted tail rotor is also provided with a large circular hub having at least five blades, and preferably at least six or eight blades.

A two-blade non-ducted tail rotor of the prior art is referred to below as a "conventional" rotor, and each blade presents both a span and a chord that are large. Conversely, by multiplying the number of blades by a multiplier coefficient, the invention makes it possible to reduce the chord of the blades.

For example, a conventional rotor may have two blades provided with profiles, each presenting a chord of 21 cm, which is equivalent to one profile having a total chord of 42 cm, when adding together the chords of the two blades.

A non-ducted tail rotor of the invention may for example have six blades, each presenting a chord of 7 cm, thereby leading to an equivalent single chord of 42 cm.

Likewise, if the profiles of the blades of a conventional rotor and the profiles of the blades of a non-ducted tail rotor of the invention are identical, then the blades of a non-ducted tail rotor of the invention have a thickness substantially equal to the quotient of the thickness of the blades of the corresponding conventional rotor divided by said multiplier coefficient.

However, the invention proposes using a hub of large dimensions. Consequently, each blade of a rotor of the invention has an airfoil element that extends outside the hub over a span that is smaller than that of a conventional rotor. Consequently, the flexibility that results from the small thickness of the blades of the rotor of the invention is acceptable by hinging the roots of the blades to the outer periphery of the hub, and thus reducing the span of the airfoil surfaces of the blades. The non-ducted tail rotor of the invention thus satisfies requirements in terms of strength of materials relative to the forces exerted on the rotor.

In order to produce a thrust equivalent to the thrust obtained on a conventional rotor, the invention thus proposes both multiplying the number of blades in a conventional rotor by a multiplier coefficient and also reducing the chord and the thickness of each of these blades by the same multiplier coefficient.

This particular dimensioning is not obvious since the airfoil element of each blade of the rotor of the invention is thus shorter than the airfoil element of a blade of an equivalent conventional rotor, because of the presence of a hub of large diameter. The fullness of the rotor of the invention is then smaller than the fullness of an equivalent prior art rotor.

Nevertheless, each blade of a conventional rotor can be subdivided virtually into an inner portion extending to a threshold radius of the rotor, and an outer portion extending from the inner portion to a free end. The Applicant observes that the extra thrust coming from the inner portion of each blade is small. Consequently, replacing these inner portions of the airfoil elements of the blades with a hub of large diameter has limited impact on the thrust produced by the rotor.

Furthermore, providing a large diameter hub and increasing the number of blades could logically lead to a significant increase in the weight of the rotor compared with a corresponding conventional rotor.

However, by going against this prejudice, the Applicant finds that the weight impact of the invention can be small.

Compared with the prior art rotor, the invention increases the number of blades by a multiplier coefficient. This increase is accompanied by reductions of the chord and of the thickness of the blades by the same multiplier coefficient, which blades are identical in profile.

The surface area of a blade profile of the invention is thus equal to the quotient of the surface area of a corresponding profile of a conventional rotor divided by the multiplier coefficient squared.

Consequently, the total weight of blades in a rotor of the invention can correspond substantially to the total weight of blades in a prior art rotor divided by the multiplier coefficient, given that the number of blades is increased by said multiplier coefficient.

This reduction thus compensates at least in part or possibly even in full for the increase in weight that results from using a large diameter hub.

Consequently, the non-ducted tail rotor of the invention goes against prejudices that consist in believing that the number of blades in a rotor must not be increased for reasons of weight and physics.

Such blades reduce the static and dynamic forces exerted in flight. Consequently, the synergy between the characteristics of the non-ducted tail rotor of the invention tends to limit the forces exerted in flight on the pitch control linkage compared with a conventional rotor.

It may thus be possible to avoid installing a force compensator, or even a servo-control.

For example, the number of blades of a light helicopter having a conventional two-blade rotor may be multiplied by a multiplier coefficient equal to 2.5 so as to obtain a non-ducted tail rotor of the invention having five blades.

In accordance with the above explanations, such a non-ducted tail rotor of the invention can thus reduce the static and dynamic forces exerted in flight compared with the conventional two-blade rotor.

Nevertheless, the number of blades may be increased. Thus, installing at least six blades leads to further reduction in the noise given off by the rotor.

Furthermore, the non-ducted tail rotor of the invention may possess fullness that is equivalent to that of a conventional rotor in a ring of the rotor extending radially from the internal radius to the maximum radius.

Nevertheless, the number of blades of the non-ducted tail rotor of the invention can be increased in order to obtain fullness that is greater than the fullness of a conventional rotor in that ring. Returning to the above example, a conventional rotor may have two blades with profiles each presenting a chord of 21 cm. The non-ducted tail rotor of the invention may then, by way of example, have not six blades, each presenting a chord of 7 cm, but rather at least seven blades, each presenting a chord of 7 cm, thereby increasing the fullness of the rotor in said ring.

Such a characteristic may make it possible to obtain blades that present profiles close to their maximum lift/drag ratio. Under such circumstances, the blades need not be twisted at all, or they may be twisted only a little.

In addition, the hub may have a wall constituting an airfoil. Under such circumstances, the hub may generate additional lift in forward flight, which may be useful in the event of unwanted stopping of the non-ducted tail rotor.

The non-ducted tail rotor may also include one or more of the following additional characteristics.

For example, the internal radius is substantially equal to one-third of the maximum radius, each airfoil element of each blade extending from the body to a free end over a length substantially equal to two-thirds of the maximum radius.

These proportions make it possible to obtain a non-ducted tail rotor that can in particular take the place of a two-blade non-ducted rotor of the above-described type while presenting the above-mentioned advantages.

Furthermore, said body may comprise both an internal concave wall connected to the drive shaft and an external concave wall secured to the internal concave wall at said outer periphery, the internal concave wall and the external concave wall being arranged symmetrically on either side of a midplane perpendicular to said axis of rotation, the internal concave wall and the external concave wall each presenting a concave face facing an inside space of said body.

The body is then substantially in the shape of an open torus at an internal periphery.

Furthermore, at least one of said concave walls comprises a thin disk. Such a wall makes it possible to produce additional lift during forward flight by presenting an angle of incidence relative to the forward speed of the aircraft.

A thin disk is a disk presenting a thin profile. Reference may be made to the following Internet address, which describes thin profiles:

http://fr.wikipedia.org/wiki/
 Th%C3%A9orie_des_profils_minces.

Furthermore, the external concave wall may include a central orifice around the axis of rotation for use in maintenance. Such a central orifice enables an operator to have access to the center of the hub for maintenance operations.

The central orifice may optionally be closed by a removable cover.

In addition, the body includes one radial opening per blade at said outer periphery between the internal concave wall and the external concave wall, the root of each blade being swivel-hinged about a pitch axis at said outer periphery by means of a bearing, each bearing being arranged in one of said openings between each root and said body.

A possibly laminated bearing serves to hold the root of the blade at said outer periphery. Furthermore, the blade gives each airfoil element a degree of freedom to swivel about a pitch axis, and possibly also to flap.

In addition, each blade includes a twistable bundle extending in said body from one end secured to the airfoil element of the blade to another end secured to said body.

Each twistable bundle may be connected to a spar of a blade in order to withstand the centrifugal forces to which the blade is subjected.

In addition, the bundle is said to be twistable in that it is capable of twisting under the effect of aerodynamic stresses. Under such circumstances, the twistable bundle does not prevent the blade swiveling along its pitch axis.

Installing a hub of large dimensions makes it possible to use twistable bundles of considerable length, thereby enabling them to twist in appropriate manner.

In particular, the body includes a central portion secured to the drive shaft and an internal concave wall secured to the central portion, each twistable bundle being secured to the central portion.

Each twistable bundle is then fastened as close as possible the axis of rotation of the rotor.

Furthermore, at least one blade is a blade that is straight and non-twisted. Such a blade tends to linearize the operation of the non-ducted tail rotor.

Nevertheless, the blades may present a twist relationship.

In addition, the blades are optionally distributed circumferentially in non-equidistant manner over the outer periphery.

Consequently, the circular arc between two adjacent blades may differ from one pair of blades to another pair of blades.

Such a characteristic tends to minimize the noise given off by the rotor, in particular at a frequency that is equal to the product of the number of blades multiplied by the speed of rotation of the tail rotor.

For example, a tail rotor having at least six blades presents a circumferentially irregular distribution of blades in order to limit the noise given off by the tail rotor.

Furthermore, the non-ducted tail rotor of the invention includes one pitch rod per blade, each pitch rod being hinged to a pitch lever of a blade, each pitch rod passing through a transverse slot through the body.

In addition, the rotor may include a member connected to each pitch rod, this member being movable transversely along said drive shaft so that a movement in translation of said member induces a movement in translation of said pitch rods.

Furthermore, each blade has two return-to-flat masses, referred to as "Chinese weights", projecting in elevation on either side of a root inside the body.

If necessary, these Chinese weights may be arranged to reduce the forces that need to be delivered in order to change the pitch of the blades.

In addition to a non-ducted tail rotor, the invention also provides a rotary wing aircraft having such a non-ducted tail rotor.

The invention also provides a method of arranging a rotor referred to as "replacement" rotor of the invention on an aircraft having a non-ducted rotor referred as to "rotor for replacement", the rotor for replacement having at least two blades, each extending to a free end, each blade of said rotors presenting a spanwise succession of profiles, each profile presenting a chord and a thickness relationship that are functions of said chord.

Consequently, and in accordance with the above explanations, the method comprises the following steps:

determining a "maximum" radius for a circle described by the blades of the rotor for replacement, and dimensioning the replacement rotor so that the blades of the replacement rotor describe a circle presenting said maximum radius;

determining an "internal" radius for a circular body of a hub of said replacement rotor, the internal radius lying in the range 0.2 times to 0.4 times said maximum radius;

determining a multiplier coefficient greater than unity, with the number of blades of the replacement rotor being equal to not less than the product of the number of blades of the rotor for replacement multiplied by said multiplier coefficient; and arranging on said replacement rotor a number of blades of the replacement rotor equal to the product of the number of blades of the rotor for replacement multiplied by said multiplier coefficient, each blade of the replacement rotor having profiles identical to the profiles of the blades of the rotor for replacement, the chord of each profile of a blade of the replacement rotor at a given radius referred as to "calculation" radius being equal to the quotient of the chord of the profile of a blade of the rotor for replacement at said calculation radius divided by said multiplier coefficient.

BRIEF DESCRIPTION OF THE SEVERAL VIEWS OF THE DRAWINGS

The invention and its advantages appear in greater detail from the context of the following description of examples given by way of illustration and with reference to the accompanying figures, in which:

FIG. 3 shows a rotorcraft having a rotor for replacement;

FIG. 4 is a diagram showing a blade section of a rotor for replacement;

FIG. 5 shows the FIG. 3 rotorcraft, now provided with a replacement rotor of the invention; and FIG. 6 is a diagram showing a blade section of the replacement rotor of FIG. 5.

Elements shown in more than one of the figures are given the same references in each of them.

DETAILED DESCRIPTION OF THE INVENTION

Figure 1:
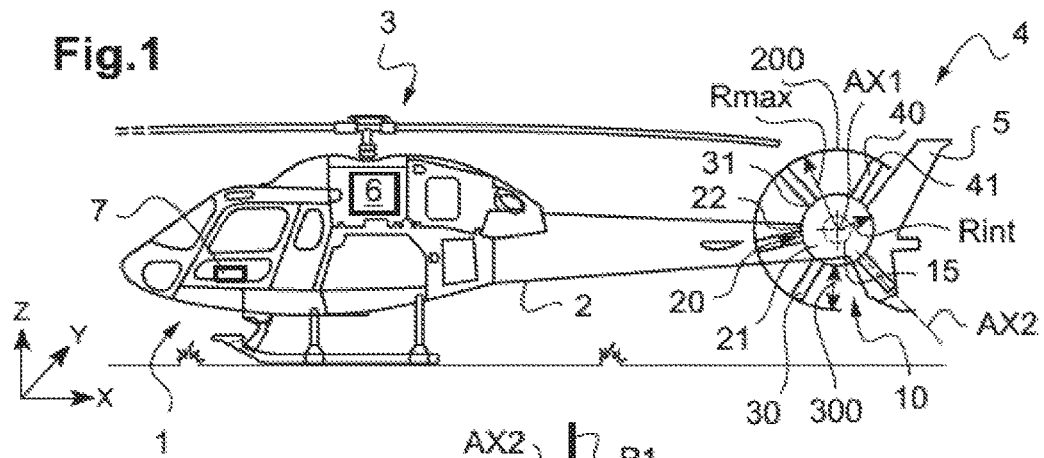
FIG. 1 is a side view of a rotorcraft of the invention.
Figure 2:
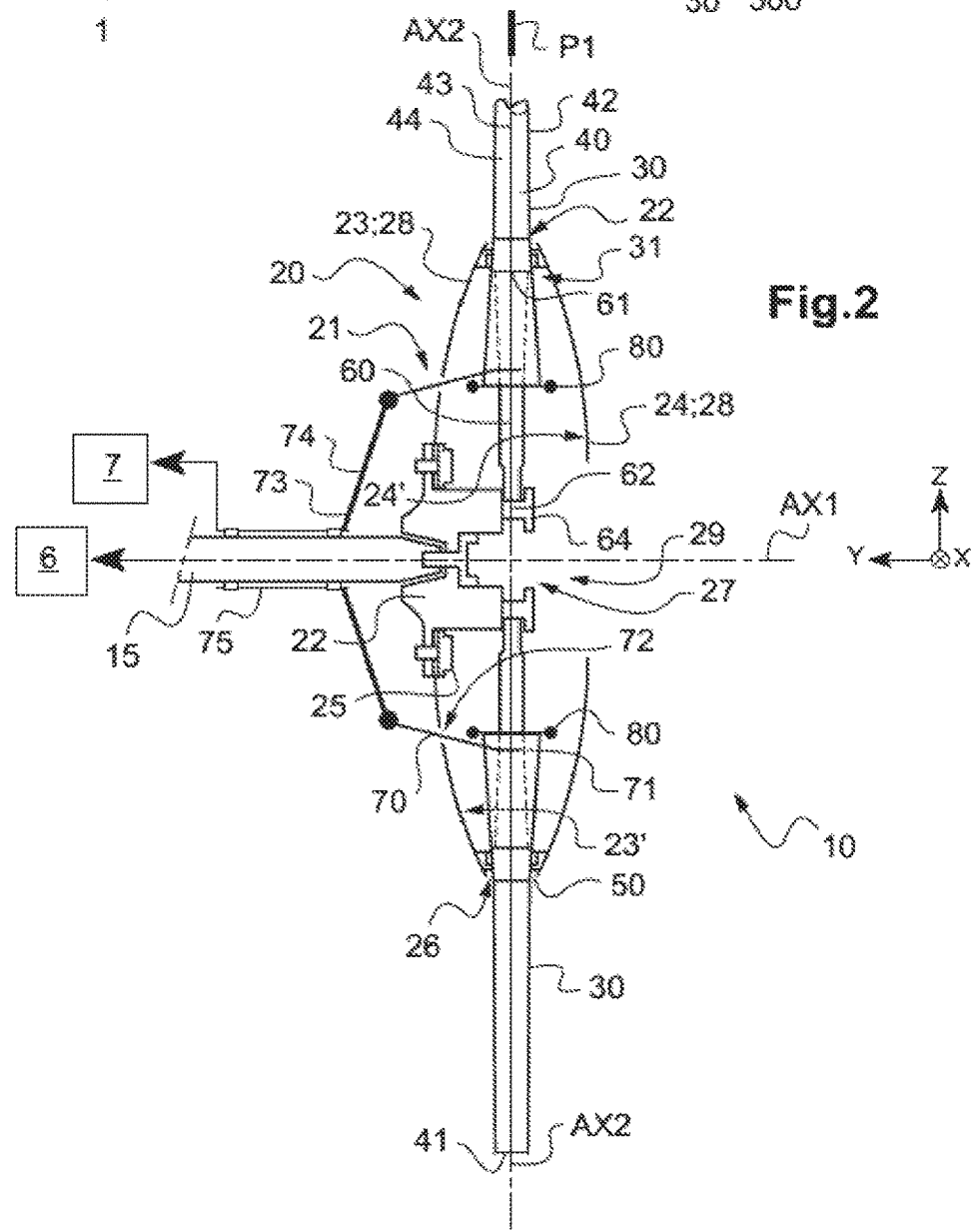
FIG. 2 is a diagram showing a non-ducted tail rotor of the invention.

Three mutually orthogonal directions X, Y, and Z are shown in FIGS. 1 and 2.

The first direction X is said to be "longitudinal". The second direction Y is said to be "transverse". Finally, the third direction Z is said to be "in elevation".

FIG. 1 shows a rotary wing aircraft 1, and in particular a helicopter.

The aircraft 1 has a fuselage 2 carrying a lift and propulsion rotor 3. The fuselage 2 also extends longitudinally to a tail end 4. This tail end 4 is provided with a tail fin 5 and with a non-ducted tail rotor 10 of the invention.

The tail rotor is said to be "non-ducted" because there is no fairing surrounding the blade 30 of the tail rotor.

Furthermore, the aircraft 1 has a power plant 6 for driving the lift and propulsion rotor 3 in rotation and also for driving the non-ducted tail rotor 10 in rotation. The power plant thus comprises at least one engine connected directly or indirectly via at least one main power transmission gearbox to a drive shaft 15 for driving the non-ducted tail rotor 10.

The aircraft 1 also has control means 7 for applying collective control to the pitch angle of the blades 30 of the non-ducted tail rotor 10. By way of example, the control means 7 may comprise pedals.

The non-ducted tail rotor 10 has a hub 20 that is rigidly secured to the drive shaft 15. The non-ducted tail rotor 10 also has at least five blades 30, each carried by the hub 20.

The non-ducted tail rotor 10 is a large diameter rotor. Consequently, each blade extends to a free end 41. The free end 41 thus describes a circle 200 of large diameter and presenting a radius referred to as "maximum radius" Rmax.

Furthermore, the hub 20 is itself a hub of large diameter.

Consequently, the hub 20 comprises a body 21. The body 21 is circular in shape, being centered on the axis of rotation AX1 of the non-ducted tail rotor. Consequently, the body 21 presents an outer periphery 22 describing a circle. This inner circle is defined by a radius referred to as "internal" radius Rint that extends between the axis of rotation AX1 and the outer periphery 22 of the body 21.

The internal radius Rint consequently lies in the range 0.2 to 0.4 times the maximum radius Rmax. Consequently, the hub is indeed a hub of large dimensions.

Furthermore, the body 21 is a hollow body serving in particular to arrange components of the blade in the hub.

Thus, each blade 30 comprises a root 31 that is extended by an airfoil element 40.

The airfoil element 40 projects from the body 21, extending from the root 31 of the blade as far as a free end 41. This airfoil element is characterized in particular by a span that is relatively short, in comparison with the span of the blades of a conventional two-blade rotor.

For example, the internal radius Rint is equal to one-third of the maximum radius Rmax. Under such circumstances, each airfoil element 40 projects outside the body 21 over a length 300 that is equal to two-thirds of the maximum radius Rmax.

In addition, the root 31 of each blade is swivel-hinged to the outer periphery 22 of the hub about a pitch axis AX2. Each blade is thus a variable pitch blade.

FIG. 2 shows a non-ducted fan of the invention in detail.

Thus, the hub 20 may comprise a hollow annular ring.

Under such circumstances, the hub 20 as shown is provided with an internal concave wall 23. This concave internal wall 23 presents a concave side 23' facing towards the inside 27 of the hub.

The internal concave wall 23 is also secured directly or indirectly to the drive shaft 15.

In the example of FIG. 2, the hub 20 has a central portion 220 fastened to the drive shaft 15 by conventional means, such as screw fastener means, adhesive means, rivet means, welding means, for example.

The internal concave wall 23 is thus in the form of a disk that is hollowed out in its center. The internal concave wall 23 thus extends radially from an internal periphery towards an outer periphery. The internal periphery is thus secured to the central portion 220 by conventional means, such as screw fastener means 25, adhesive means, rivet means, welding means, staple means, for example.

This disk may be a thin disk.

Furthermore, the hub 20 as shown is provided with an external concave wall 24 secured to the internal concave wall 23.

The external concave wall 24 presents a concave face 24' facing towards the inside 27 of the hub, i.e. towards the concave face of the internal concave wall.

The external concave wall 24 is in the form of a disk 28. The external concave wall 24 thus extends radially from the axis of rotation AX1 to an outer periphery. The outer periphery of the internal concave wall is then secured to the outer periphery of the external concave wall by conventional means, such as screw fastener means, adhesive means, rivet means, staple means, welding means, for example.

The internal concave wall and the external concave wall may form component portions of a single one-piece part.

This disk of the external concave wall 24 may be a thin disk.

In addition, the external concave wall may include a central orifice 29 around the axis of rotation AX1.

Furthermore, the internal concave wall 23 and the external concave wall 24 are arranged symmetrically on either side of a midplane P1 perpendicular to the axis of rotation AX1.

Under such circumstances, the body 21 shown includes a plurality of radial openings 26 at the outer periphery 22. The body thus possesses one opening 26 per blade 30 in order to enable each blade to pass through a respective opening. Each opening 26 thus extends between the internal concave wall 23 and the external concave wall 24.

Consequently, the root 31 of each blade 30 is swivel-hinged about a pitch axis AX2 to the outer periphery 22. In particular, a bearing 50 is arranged in each opening 26 between a blade and the body 21.

Consequently, each blade may include an airfoil element 40 having an outer cover 42, at least one spar 43, and possibly filler materials 44. The outer cover may be a rigid shell presenting an appropriate aerodynamic profile.

This airfoil element extends outside the hub 20 from the outer periphery 22 to a free end 41.

Each blade may be a blade that is straight and not twisted. A straight blade has a profile of constant chord. Furthermore, a non-twisted blade presents chords that are contained in a plane referred to as the "chord" plane.

Furthermore, each blade has a root 31 arranged in the hub. The root 31 may be an extension of the airfoil element, or it may be in the form of a collar secured to the airfoil element, for example.

In addition, each blade may include a twistable bundle 60. Such a twistable bundle 60 represents a part that can be twisted about at least one axis. For example, a twistable bundle may comprise a blade made of composite materials.

Each bundle 60 extends in then body 21 of the hub from a first end 61 to a second end 62.

The first end 61 is then secured to the airfoil element 40 of the blade 30. In particular, the first end 61 is secured to the spar of the airfoil element by conventional means, such as screw fastener means, staple means, adhesive means, rivet means, or welding means, for example.

The second end 62 is thus secured to the hub. In particular, the second end 62 is secured to the central portion 220 of the hub by conventional means, such as screw fastener means 64, staple means, adhesive means, rivet means, welding means, for example.

Furthermore, each blade 30 may include two return-to-flat masses 80. These two return-to-flat masses 80 project in elevation one either side of the root 31 of a blade inside the body 21, i.e. in a direction that is generally parallel to the axis of rotation AX1.

In addition, the blades 30 are optionally distributed in non-equidistant manner around the circumference of the outer periphery 22.

The non-ducted tail rotor 10 is also provided with a pitch rod 70 for each blade. Each pitch rod 70 is hinged to a pitch lever 71 of a blade 30. By way of example, such a pitch lever may comprise a clevis secured to the root 31 of the blade.

Furthermore, each pitch rod 70 passes through a transverse slot 72 in the body 21 in order to extend outside the hub.

Under such circumstances, the non-ducted tail rotor 10 may include a member 73 that is connected to each pitch rod 70. The member 73 is movable transversely along the drive shaft 15 so that a movement in translation of the member 73 causes the pitch rod 70 to move in translation, and consequently causes the pitch of the blades to be modified.

By way of example, the member 73 comprises a control disk 74 hinged to each pitch rod. In addition, the member 73 has a tubular seat 75 secured to the control disk. The tubular seat is then mounted to move on the drive shaft 15.

The member 73 is connected to flight controls 7, optionally via a servo-control or indeed a force compensator.

Such a non-ducted tail rotor may be arranged on a helicopter of a novel type.

Nevertheless, and with reference to FIG. 3, the invention enables a method to be performed for modifying an existing aircraft 100.

The aircraft 100 then has a non-ducted rotor called, for convenience, a "rotor 110 for replacement". The rotor 110 for replacement is provided with at least two blades 111 extending to a free end, and in particular two blades in the example shown in FIG. 3.

Under such circumstances, a manufacturer determines a "maximum" radius Rmax for a circle described by the blades 111 of the rotor for replacement.

Consequently, the rotor for replacement of the aircraft 100 needs to be removed, and then replaced by a rotor referred to as "replacement" rotor 120, as shown in FIG. 5. The replacement rotor thus has rotor blades 121 that are to describe a circle presenting the maximum radius Rmax. The replacement rotor is a rotor of the type shown in FIG. 2.

Consequently, the rotor for replacement and the replacement rotor are both non-ducted rotors presenting a maximum radius Rmax.

In order to dimension the replacement rotor, the manufacturer then determines, possibly with the help of a computer, the internal radius Rint of the hub of the replacement rotor. This internal radius is set to lie in the range 0.2 times to 0.4 times the maximum radius, e.g. 0.3 times the maximum radius.

Furthermore, possibly with the help of a computer, the manufacturer determines a multiplier coefficient n greater than unity. The manufacturer then sets the number of blades 121 of the replacement rotor 120 by multiplying the number of blades of the rotor 110 for replacement by the multiplier coefficient n.

In the example of FIG. 5, the multiplier coefficient n is equal to 3, so the replacement rotor has six blades 121 instead of two blades 111 for the rotor for replacement. Nevertheless, the manufacturer could decide to increase the number of blades, e.g. to seven blades or eight blades.

With reference to FIG. 4, each blade 111 of the rotor for replacement presents a succession of profiles 85 over a span L0 between the internal radius and the maximum radius. Each profile presents a chord C0 and a thickness E0.

With reference to FIG. 6, the manufacturer can establish the shape for the blades of the replacement rotor on the basis of the blades of the rotor for replacement. Under such circumstances, each profile of a blade of the replacement rotor is geometrically similar to a corresponding profile of a blade of the rotor for replacement.

Consequently, the chord C1 of each profile 86 of a blade 121 of the replacement rotor 120 situated at a radius referred to as the "calculation" radius 87 is equal to the quotient of the chord C0 of the profile 85 of a blade 111 of the rotor 110 for replacement at said calculation radius 87 as divided by the multiplier coefficient n, i.e.:

$$C1 = C0/n$$

where "/" represents the division sign.

Likewise, the thickness E1 of the profile 86 of a blade 121 of the replacement rotor 120 situated at the calculation radius 87 is equal to the quotient of the thickness E0 of the profile 85 of a blade 111 of the rotor 110 for replacement at said calculation radius 87 divided by the multiplier coefficient n, i.e.:

$$E1 = E0/n$$

where "/" represents the division sign.

Thereafter, the manufacturer fabricates the replacement rotor and installs the replacement rotor on the aircraft 100.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A non-ducted tail rotor for a rotary wing aircraft, the non-ducted tail rotor comprising a hub and a plurality of blades, the non-ducted tail rotor having a drive shaft connected to the hub in order to set the plurality of blades into rotation about an axis of rotation, each blade of the plurality of blades extending to a free end that, in rotation, describes a circle presenting a given radius referred to as the maximum radius, wherein the hub is rigidly secured to the drive shaft, the plurality of blades comprising at least five blades, the hub comprising a hollow circular body centered on the axis of rotation, the body presenting a radius referred to as the internal radius between the axis of rotation and an outer periphery of the body, the internal radius lying in the range 0.2 times to 0.4 times the maximum radius, each blade of the plurality of blades presenting a root extended by an airfoil element projecting from theme body and extending from the root to the free end, the root being swivel-hinged to the outer periphery about a pitch axis; and wherein the body comprises both an internal concave wall connected to the drive shaft and an external concave wall secured to the internal concave wall at the outer periphery, the internal concave wall and the external concave wall being arranged symmetrically on either side of a midplane perpendicular to the axis of rotation, the internal concave wall and the external concave wall each presenting a concave face facing an inside space of the body.

2. The non-ducted tail rotor according to claim 1, wherein the internal radius is one-third of the maximum radius, each airfoil element of each blade of the plurality of blades extending from the body to the free end over a length two-thirds of the maximum radius.

3. The non-ducted tail rotor according to claim 1, wherein at least one of the concave walls comprises a thin disk.

4. The non-ducted tail rotor according to claim 1, wherein the external concave wall includes a maintenance central orifice around the axis of rotation.

5. The non-ducted tail rotor according to claim 1, wherein the body includes one radial opening for each blade of the plurality of blades at the outer periphery between the internal concave wall and the external concave wall, the root of each blade of the plurality of blades being swivel-hinged about a pitch axis at the outer periphery by means of a bearing, each bearing being arranged in one of the radial openings between each root and the body.

6. The non-ducted tail rotor according to claim 1, wherein each blade of the plurality of blades includes a twistable bundle extending in the body from one end secured to the airfoil element of the blade to another end secured to the body.

7. The non-ducted tail rotor according to claim 6, wherein the body includes a central portion secured to the drive shaft and an internal concave wall secured to the central portion, each twistable bundle being secured to the central portion.

8. The non-ducted tail rotor according to claim 1, wherein at least one airfoil element of the airfoil elements is straight and non-twisted.

9. The non-ducted tail rotor according to claim 1, wherein the plurality of blades are distributed circumferentially in non-equidistant manner over the outer periphery.

10. The non-ducted tail rotor according to claim 1, wherein the non-ducted tail rotor includes one pitch rod for each blade of the plurality of blades, each pitch rod being hinged to a pitch lever of each blade of the plurality of blades, each pitch rod passing through a transverse slot through the body.

11. The non-ducted tail rotor according to claim 10, wherein the non-ducted tail rotor includes a member connected to each pitch rod, the member being movable transversely along the drive shaft so that a movement in translation of the member induces a movement in translation of the pitch rods.

12. The non-ducted tail rotor according to claim 1, wherein each blade of the plurality of blades has two return-to-flat masses projecting in elevation on either side of the root inside the body.

13. The non-ducted tail rotor according to claim 1, wherein the internal radius lies in the range 0.25 times to 0.4 times the maximum radius.

14. A rotary wing aircraft having a non-ducted tail rotor, wherein the non-ducted rotor is according to claim 1.

15. A method of arranging a rotor referred to as replacement rotor according to claim 1 on an aircraft having a non-ducted rotor referred to as rotor for replacement, the rotor for replacement having at least two blades, each blade extending to a free end, each blade of the rotors presenting a spanwise succession of profiles, each profile presenting a chord and a thickness relationship that are functions of the chord, wherein the method comprises the following steps:
  determining a maximum radius for a circle described by the blades of the rotor for replacement, and dimensioning the replacement rotor so that the blades of the replacement rotor describe a circle presenting the maximum radius;
  determining an internal radius for a circular body of a hub of the replacement rotor, the internal radius lying in the range 0.2 times to 0.4 times the maximum radius;
  determining a multiplier coefficient (n) greater than unity, with the number of blades of the replacement rotor being equal to not less than the product of the number of blades of the rotor for replacement multiplied by the multiplier coefficient (n); and
  arranging on the replacement rotor the number of blades of the replacement rotor equal to the product of the number of blades of the rotor for replacement multiplied by the multiplier coefficient (n), each blade of the replacement rotor having profiles identical to the profiles of the blades of the rotor for replacement, the chord of each profile of each blade of the replacement rotor at a given radius referred to as calculation radius being equal to the quotient of the chord of the profile of each blade of the rotor for replacement at the calculation radius divided by the multiplier coefficient (n).

16. A non-ducted tail rotor for a rotary wing aircraft, the non-ducted tail rotor comprising a hub and a plurality of blades, the non-ducted tail rotor having a drive shaft connected to the hub in order to set the plurality of blades into rotation about an axis of rotation, each blade of the plurality of blades extending to a free end that, in rotation, describes a circle presenting a given radius referred to as the maximum radius, wherein the hub is rigidly secured to the drive shaft, the plurality of blades comprising at least five blades, the hub comprising a hollow circular body centered on the axis of rotation, the body presenting a radius referred to as the internal radius between the axis of rotation and an outer periphery of the body, the internal radius lying in the range 0.2 times to 0.4 times the maximum radius, each blade of the plurality of blades presenting a root extended by an airfoil element projecting from the body and extending from the root to the free end, the root being swivel-hinged to the outer periphery about a pitch axis, wherein the non-ducted tail rotor includes one pitch rod for each blade of the plurality of blades, each pitch rod being hinged to a pitch lever of each blade of the plurality of blades, each pitch rod passing through a transverse slot through the body.

17. The non-ducted tail rotor according to claim 16, wherein the internal radius is one-third of the maximum radius, each airfoil element of each blade of the plurality of blades extending from the body to the free end over a length two-thirds of the maximum radius.

18. The non-ducted tail rotor according to claim 16, wherein the non-ducted tail rotor includes a member connected to each pitch rod, the member being movable transversely along the drive shaft so that a movement in translation of the member induces a movement in translation of the pitch rods.

19. A rotary wing aircraft having a non-ducted tail rotor, wherein the non-ducted tail rotor comprises a hub and a plurality of blades, the non-ducted tail rotor having a drive shaft connected to the hub in order to set the plurality of blades into rotation about an axis of rotation, each blade of the plurality of blades extending to a free end that, in rotation, describes a circle presenting a given radius referred to as the maximum radius, wherein the hub is rigidly secured to the drive shaft, the plurality of blades comprising at least five blades, the hub comprising a hollow circular body centered on the axis of rotation, the body presenting a radius referred to as the internal radius between the axis of rotation and an outer periphery of the body, the internal radius lying in the range 0.2 times to 0.4 times the maximum radius, each blade of the plurality of blades presenting a root extended by an airfoil element projecting from the body and extending from the root to the free end, the root being swivel-hinged to the outer periphery about a pitch axis.

20. The non-ducted tail rotor according to claim 19, wherein the plurality of blades are distributed circumferentially in non-equidistant manner over the outer periphery.

* * * * *